United States Patent
Bequette et al.

(10) Patent No.: US 6,503,036 B1
(45) Date of Patent: Jan. 7, 2003

(54) VEHICLE SLIDING FLOOR EXTENSION AND CARGO BRACE

(76) Inventors: Lawrence M. Bequette, 4289 Blueridge St., North Port, FL (US) 34287; Nicholas John Wladyka, 4725 Tamiami Trail, Port Charlotte, FL (US) 33980

( * ) Notice: Subject to any disclaimer, the term of this patent is extended or adjusted under 35 U.S.C. 154(b) by 0 days.

(21) Appl. No.: 10/068,541

(22) Filed: Feb. 8, 2002

(51) Int. Cl.⁷ .................................................. B60P 7/08
(52) U.S. Cl. ........................... 410/94; 410/121; 410/91
(58) Field of Search .......................... 410/94, 121, 90, 410/91, 153, 155, 95; 296/26.09, 39.2; 248/351; 414/522; 224/403, 404, 42.33

(56) References Cited

U.S. PATENT DOCUMENTS

| | | | | |
|---|---|---|---|---|
| 3,861,541 A | * | 1/1975 | Taft et al. | |
| 4,027,892 A | * | 6/1977 | Parks | 410/3 |
| 4,222,695 A | * | 9/1980 | Sarides | 410/68 |
| 4,941,784 A | * | 7/1990 | Flament | 410/121 |
| 4,955,771 A | * | 9/1990 | Bott | 410/94 |
| 5,513,941 A | * | 5/1996 | Kulas et al. | |
| 5,549,428 A | * | 8/1996 | Yeatts | 410/94 |
| 5,788,310 A | * | 8/1998 | McKee | 410/804 |
| 6,007,282 A | * | 12/1999 | Mundt et al. | 410/94 |
| 6,012,885 A | * | 1/2000 | Taylor et al. | 410/94 |
| 6,244,802 B1 | * | 6/2001 | Stanesic et al. | 410/94 |
| 6,312,034 B1 | * | 11/2001 | Coleman, II et al. | |
| 2002/0119023 A1 | * | 8/2002 | Delay | 410/121 |

* cited by examiner

*Primary Examiner*—Stephen T. Gordon

(57) ABSTRACT

A vehicle sliding floor extension having a composite/plastic sliding extension plate attached to a truck bed or SUV rear compartment by a base plate having molded rails of metal, plastic, or composite to facilitate the controlled movement of the extension plate, the movement of the extension plate being manually or motor actuated. The durable deck surface has a plurality of holes drilled or formed to accommodate the positioning of modular partitions for containing or restraining items being transported. Motorization is also provided.

5 Claims, 11 Drawing Sheets

VEHICLE SLIDING FLOOR EXTENSION AND CARGO BRACE

BACKGROUND OF THE INVENTION

1. Field of the Invention

This invention relates to truck beds and SUV rear compartments and attachable deck extensions therefore, and more particularly, to a composite/plastic sliding extension plate attached to a truck bed or SUV rear compartment by a base plate having molded rails of metal, plastic, or composite to facilitate the controlled movement of the extension plate, the movement of the extension plate being manually or motor actuated.

2. Prior Art

The present invention relates to motor vehicles specifically relating to an improvement in the utility of the cargo area of such vehicles. With the proliferation of compact, mid-size, full-size pickup trucks with short beds and recent developments of hybrid vehicles capable of being converted from pickups to closed rear compartment configurations, limitation is placed on the ability of vehicle owners to effectively haul longer items typically accommodated by longer beds (e.g., a 4 foot×8 foot sheet of plywood.)

Owners of hybrid pickup/SUV vehicles, find difficulty in accessing the enclosed rear deck even with the tailgate down and with one or more top panels removed. Additionally, designers of these vehicles choose lining materials for the floor and walls of these compartments which have high coefficients of friction so that contents tend to remain stationary by reason of their "adhesion" to the surface. Added to the awkward access to such compartments, the difficulty in sliding something over this high friction surface dramatically decreases the utility of the vehicle. Simple activities such as grocery shopping are made difficult if not impossible by a person of small stature and even larger, stronger users have trouble reaching and moving items.

U. S. Pat. No. 6,312,034 B1 to Coleman et al, (2001) discloses a "drop-in" bed liner/deck extension which addresses a number of the difficulties described and while extension is provided, the attachment methods described, do not allow for safe transport of heavier items for which the vehicle is designed (typically 1000 lbs for a half-ton pickup) nor does it describe any motor means for moving the extension when it may be so loaded and while a braking means is therein described, it does not provide for braking at any point of extension, relying as it does upon a series of holes into which a brake pin is inserted.

Concerning the proliferation of multiple purpose vehicles such as SUVs, vans and station wagons, the rear cargo area is subjected to a divers range of uses by consumers such as hauling groceries, luggage, golf clubs, and other valuable and sometimes fragile items. A problem faces by owners of such vehicles is how to restrain smaller items or compartmentalize the space to keep items separate. An additional problem is the discomfort and potential for back injury associated with the necessity of leaning into the cargo area for loading and unloading of heavy cargo items.

The present invention addresses these problems and while it shares in common with U.S. Pat. No. 6,312,034 B1to Coleman et al the use of interlocking rails between a base member and a sliding extension member, it differs in the attachment, motorization, braking, and construction of these components and presents a modular "L" bracket design allowing for the creation of storage/containment areas anywhere over the surface of the bed extension. Additionally, the present invention is, by reason of its fixture to the vehicle as a bolt-on insert to the rear deck, more substantial in its capacity to safely manage heavy loads.

SUMMARY OF THE INVENTION

In accordance with the present invention, a base mounting platform is affixed to the bed/deck of a motor vehicle (i.e., pickup truck, SUV or hybrid, etc.) and a slideable bed extension attached by interlocking rails molded or otherwise formed between the base and the bed extension, is provided along with a motorized means of moving the bed extension and a braking means for retaining it in a chosen position and a series of attachable partitions to form compartments by which items being transported may be contained or constrained.

Accordingly, several objects and advantages of the present invention are;

1. To provide a vehicle bed floor with an integrated sliding bed extension to increase the utility of shorter beds for hauling longer items;
2. To have the bed extension available to facilitate ease of loading and unloading of items stored within the vehicle cargo area.
3. To provide a two piece interlocking base/bed extension to be firmly affixed to the existing vehicle bed or deck which is simple in its operation as well as its manufacture.
4. To provide a durable deck surface on the bed extension which has a plurality of holes drilled or formed to accommodate the positioning of modular partitions for containing or restraining items being transported.
5. To provide motorization whereby the bed extension can be moved even while heavily laden.
6. To provide a braking means by which the bed extension can be locked in any position of deployment.
7. To provide support skids interposed between the base and the bed extension, which ride over the face of the lowered tail gate as the extension is moved across it.

DESCRIPTION OF THE INVENTION

The invention is a base for attachment to the bed of a pickup truck, SUV etc, and an interlocking, slideable deck attached thereto. Both the base and the bed are made of plastic, composite or other durable material. The base is fixed to the vehicle in secure fashion and provides a support for the deck. Motor and braking apparatus are affixed between the base and the deck providing means for moving and controlling the extension of the bed beyond the limits of the existing vehicle bed and tailgate. Holes and other attachment/location means are provided along with multiple modular partitions for securing items against movement while they are being transported. The configuration of the attachment holes in a grid pattern allows for multiple arrangements of the partitions to secure and/or contain a large variety of transported items. The deck surface is textured to decrease friction against loads being carried so that, once the load is unbound or unrestrained, it can easily slide over the deck surface facilitating the management of bulky heavy articles in a manner consistent with the overall intention of the invention. The deck is interlocked with the base by a plurality of grooves and rails in the shape of a "T" or other suitable shape. Between each rail set is a fixed slide attached to the bottom side of the deck. These slides act to support and guide the deck as it is slid out over the tailgate.

The deck and thus the slides would ideally be manufactured from durable, slippery plastic material to provide maximum ease of use with minimum friction. A stop or bumper is fitted to one or more of the base rails to stop the deck from sliding out too far and possibly separating dangerously from the base. In a first embodiment, the deck is moved back and forth being driven by a motor means attached to an endless chain and attachment pad. In a further embodiment, the endless chain would be replaced by an endless wire rope with a pad attached and in a further embodiment a worm drive moves the deck. In the latter embodiment, no braking mechanism is required as the worm drive acts as a brake whenever it ceases to move. Braking in other embodiments can be accomplished using a pawl and ratchet track wherein the pawl is engaged and disengaged from the track by activation through a grip handle release common to prior art ratchet installations.

DETAILED DESCRIPTION OF A PREFERRED EMBODIMENT

Figure 1:
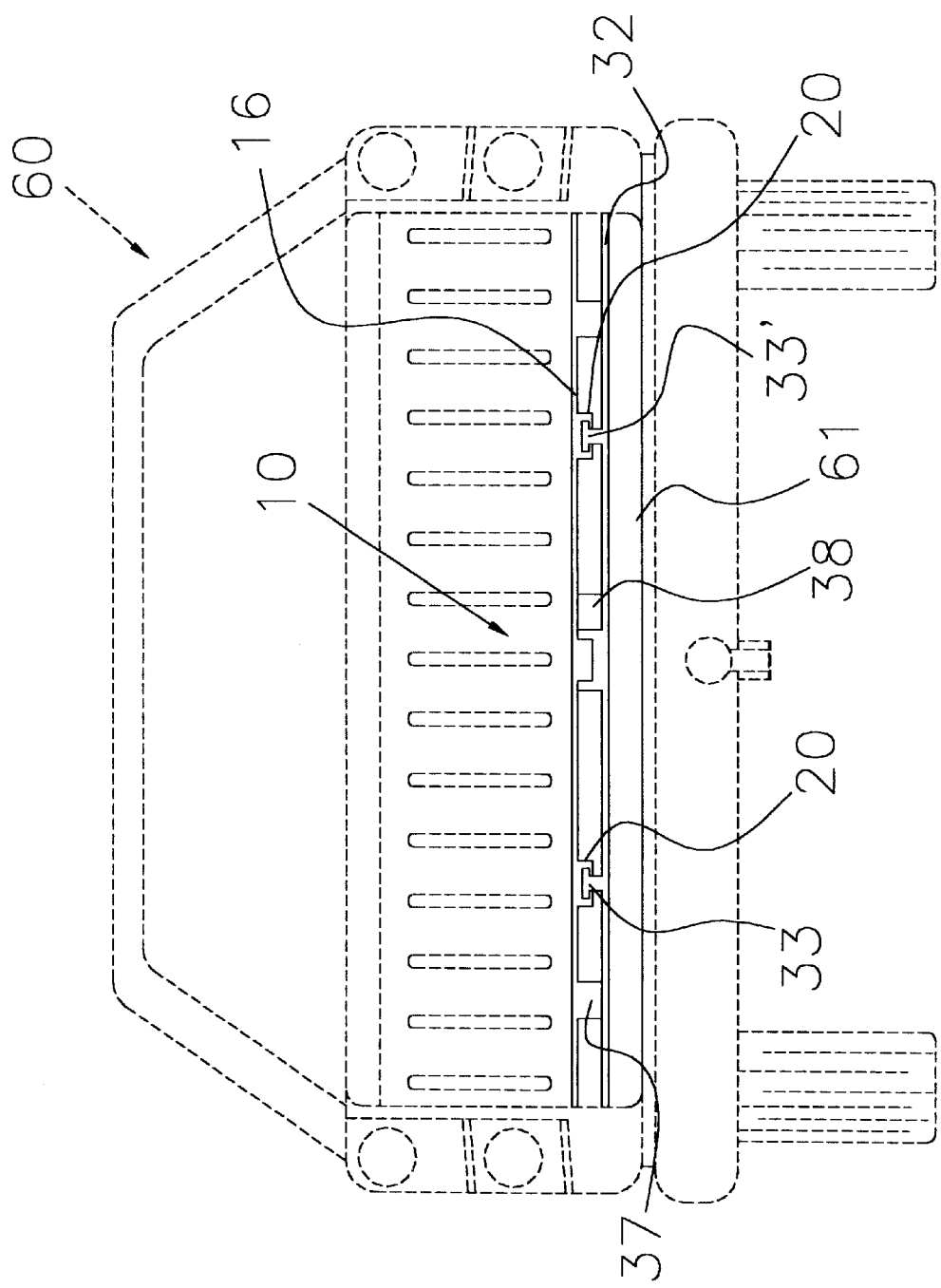
FIG. 1 is a rear elevational view partially in section, of a typical SUV/pickup/hybrid vehicle showing the invention installed in the bed compartment of the vehicle. This end view shows the relative positions of the base unit and the deck extension unit.

Referring now to the drawing wherein like numerals designate like and corresponding parts throughout the several views, the invention is designated overall by the numeral 10. In FIG. 1 bed extension unit 10 is fitted to the bed of vehicle 60. Tailgate 61 is in the down/open position. Deck 16 generally overlies base 32 riding upon T rails 33 and 33' in channels 20. Skids 37 add support to deck 16. Safety stop 38 prevents deck 16 from being over extended (see also FIGS. 3 and 4).

Figure 2:
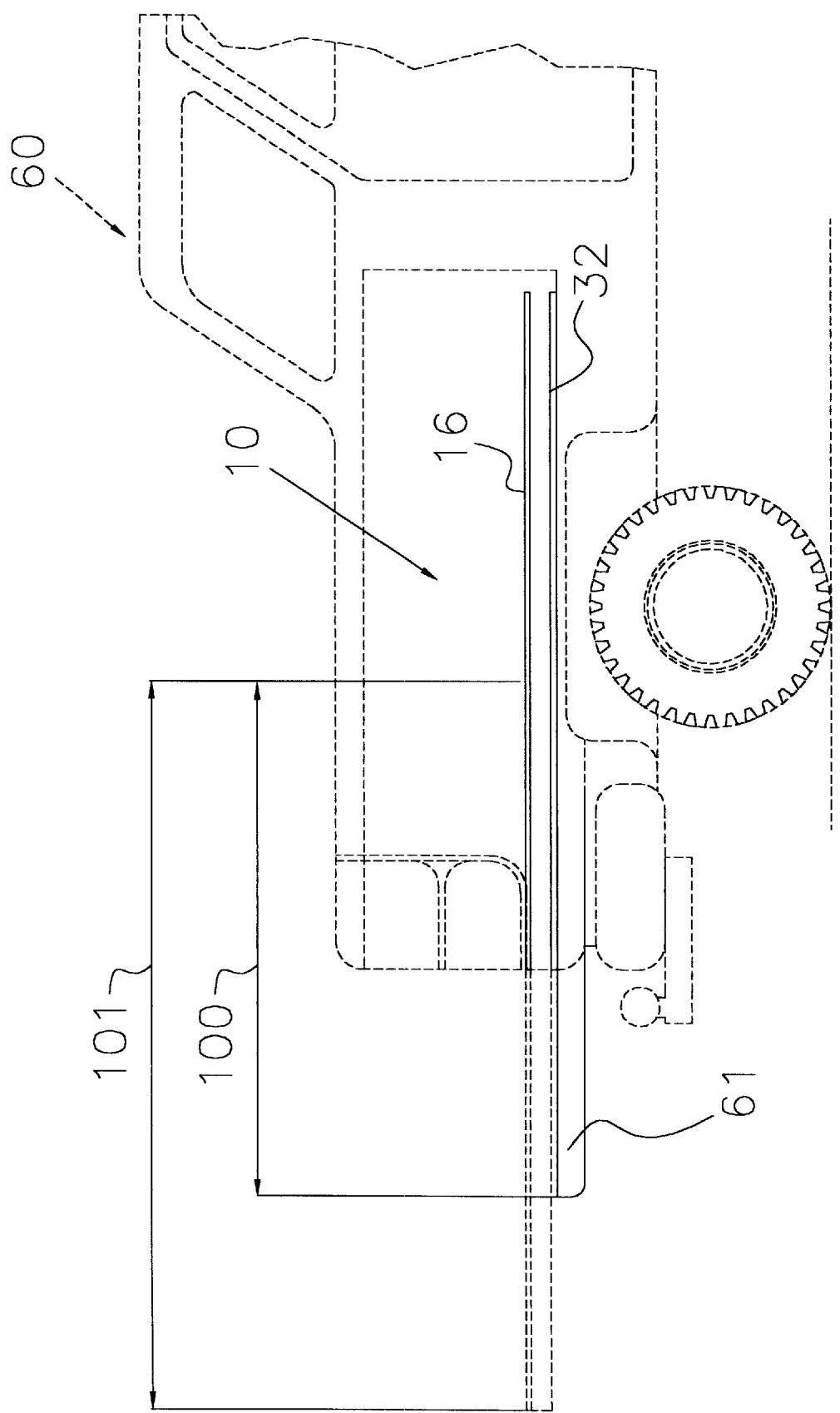
FIG. 2 is a side elevational view partially in section, of a typical SUV/pickup/hybrid vehicle showing the invention installed in the bed compartment of the vehicle. The view shows the relative positions of the base unit and the deck extension unit.

Referring now to FIG. 2 in which tailgate 61 is in the open position and bed extension unit 10 is fitted to the bed of vehicle 60. Arrow 100 denotes the limits of reach before the deployment of deck 16 and arrow 101 denotes the now extended scope of reach.

Figure 3:
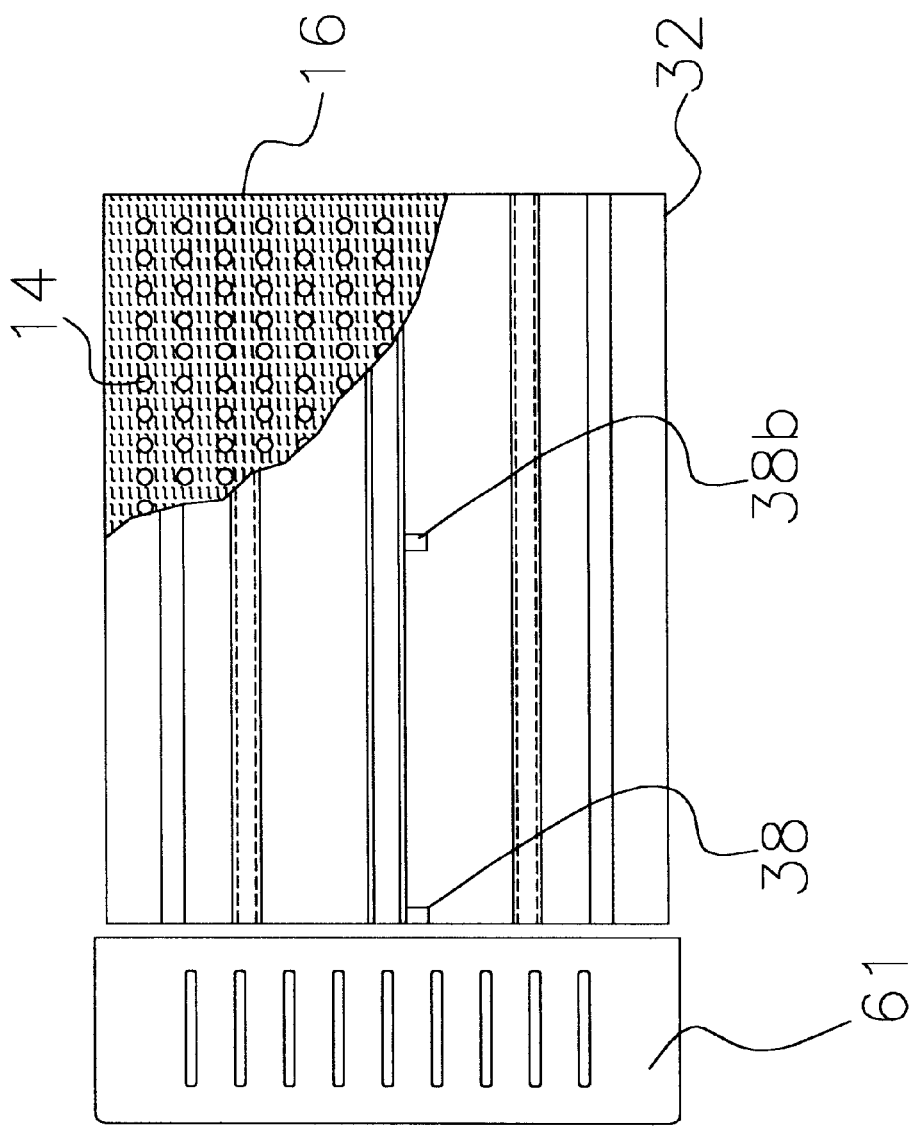
FIG. 3 is a top view partially in section of the invention, showing the relative positions of the tail gate of a vehicle and the bed extension unit.

In FIG. 3, deck 16 is in its retracted position and peg holes 14 are visible. Bumper stop 38 is positioned to catch stop 38b which attaches to deck 16.

Figure 4:
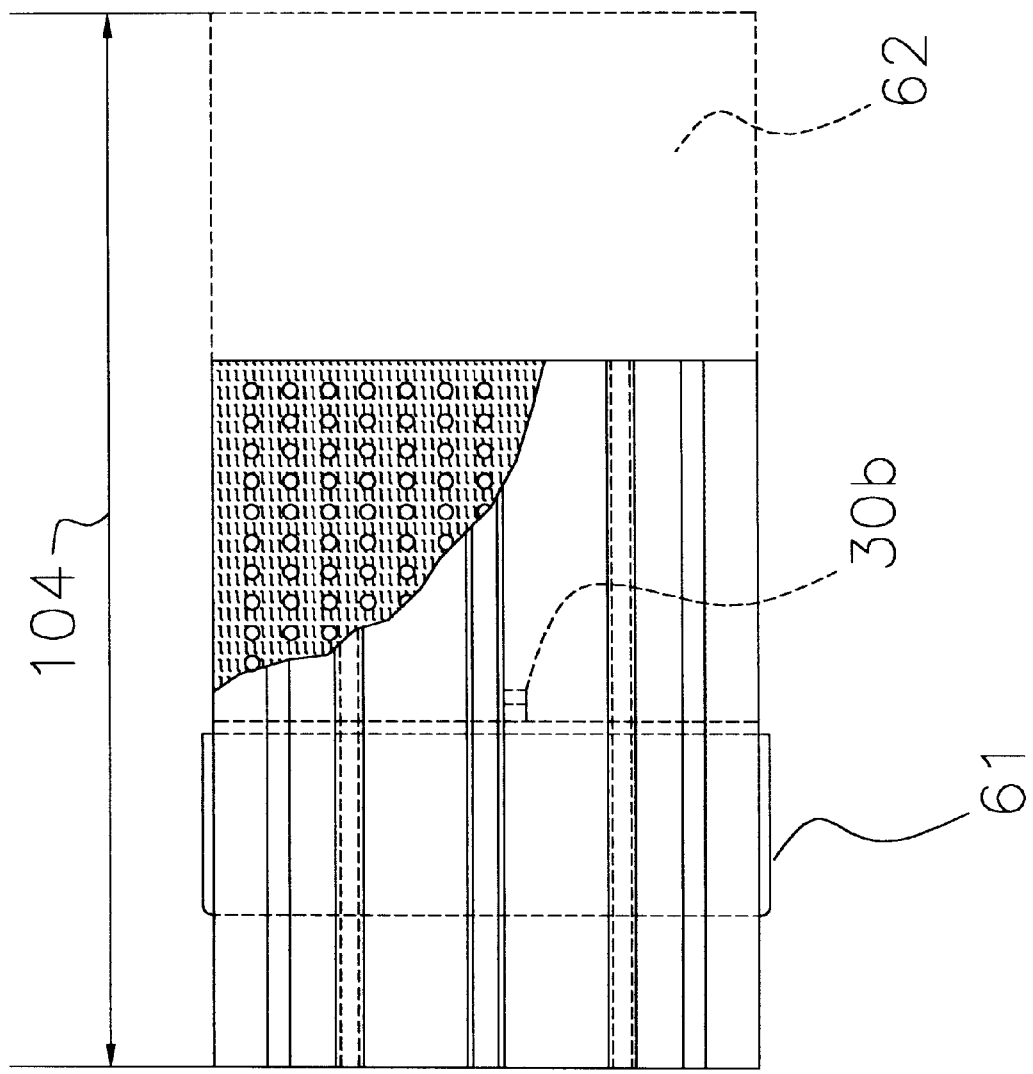
FIG. 4 is a top view partially in section of the invention, showing the relative positions of the tail gate of a vehicle and the bed extension unit as the unit is deployed to its maximum extension.

In FIG. 4, arrows 104 denote the extendable length of truck bed 62 beyond tailgate 61. Stop 30b prevents any further extension.

Figure 6:
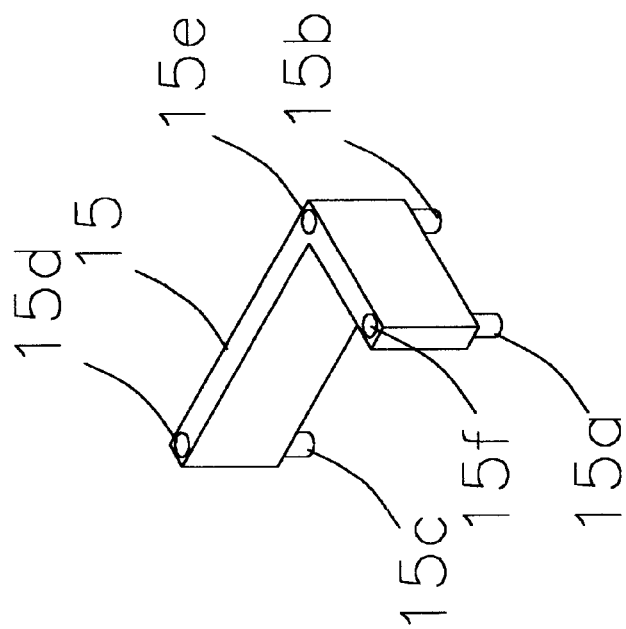
FIG. 6 is and isometric view of a modular partition unit.
Figure 5:
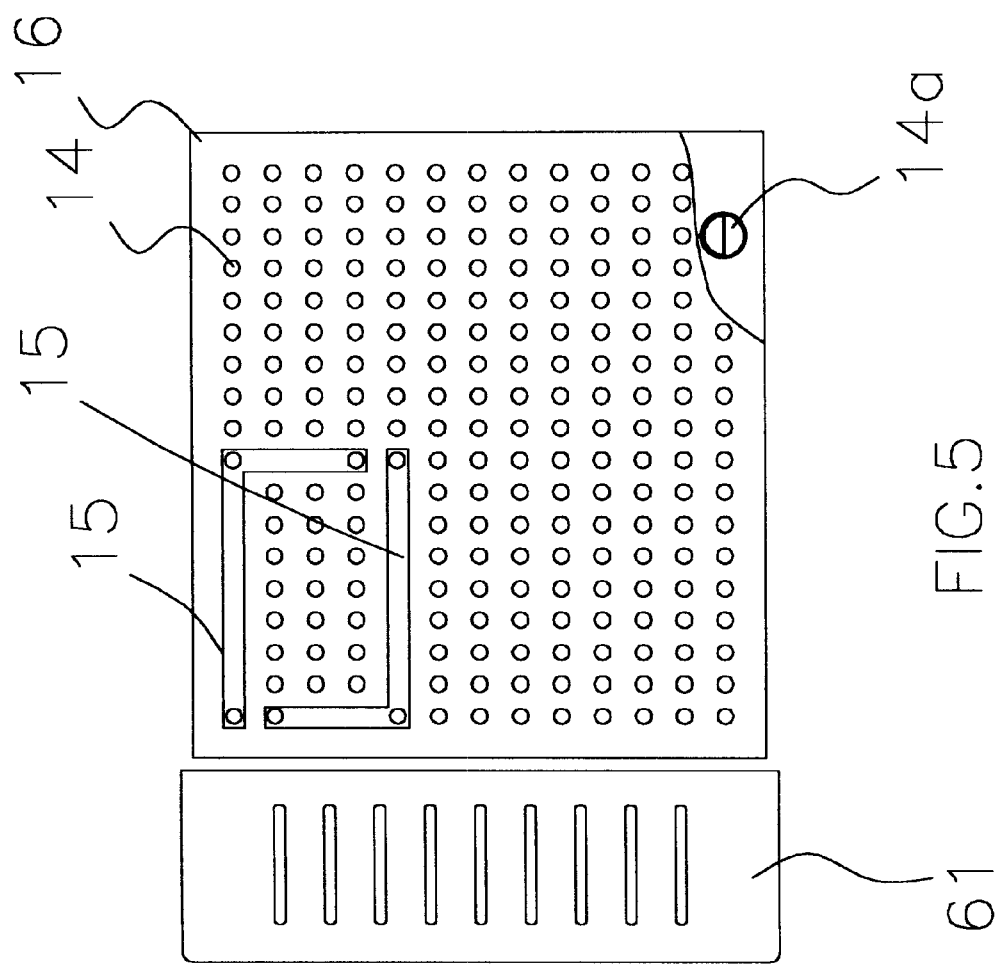
FIG. 5 is a top view of the invention showing partition sections in place and showing an example of an alternative securing point for object in the truck bed.

Referring now to FIGS. 5 and 6, peg holes 14 permit the insertion of pegs 15a,b,c to locate and fix partitions 15 on deck 16. Holes 15d,e,f allow for further partition units to be joined to partitions 15. D-ring 14a is an example of alternative attachment points used to fix objects to bed 16.

Figure 7:
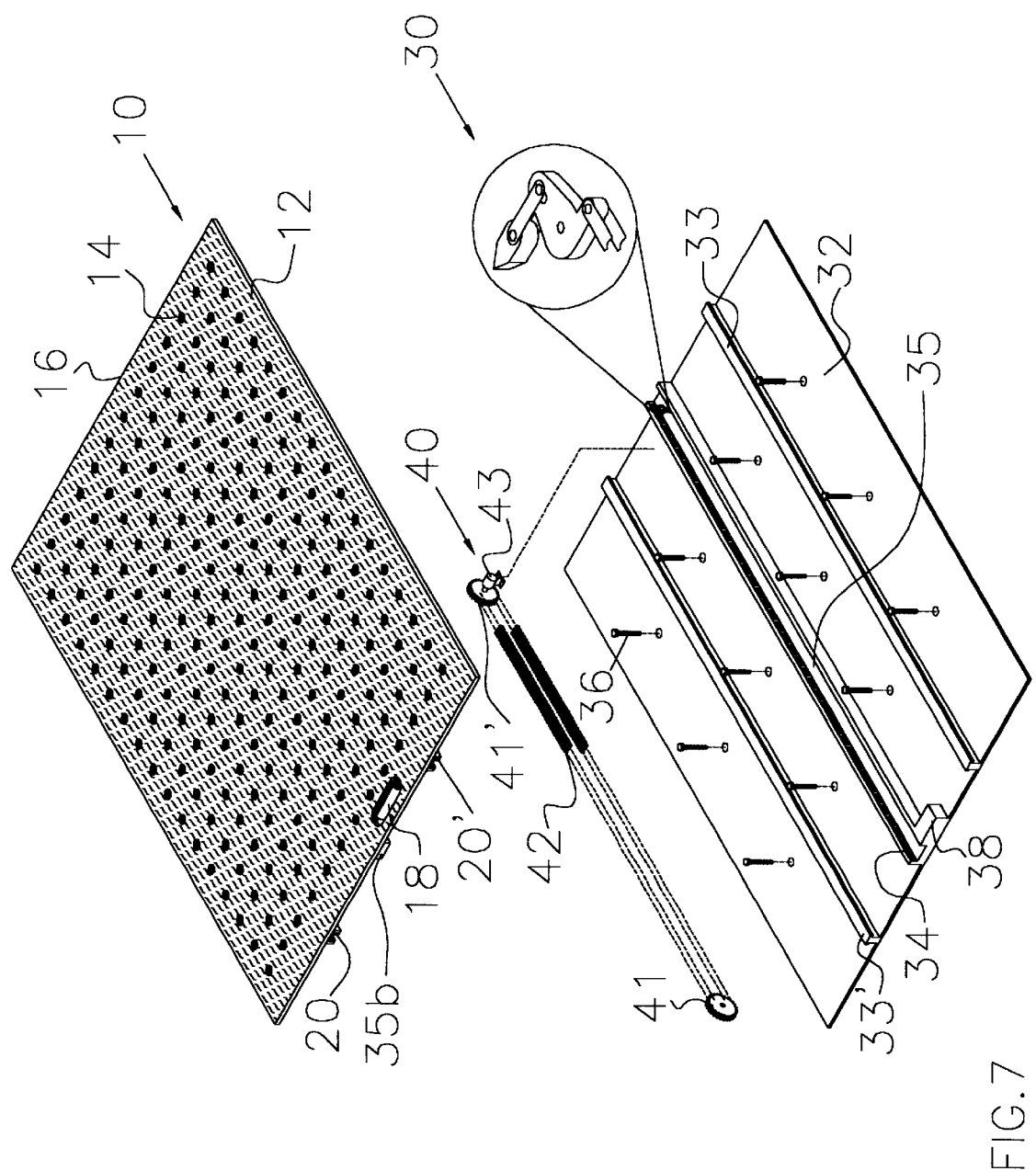
FIG. 7 is an exploded isometric view of the invention showing the general arrangement and relative positions of the components of the invention.

In FIG. 7, bolts 36 fix base 32 to the vehicle. "T" tracks 33 and 33' slot into slots 20 and 20'. Rib 35b slideably fits into slot 35. Notched track 34 engages ratchet unit 30 to act as a brake for deck 16. Raised pattern 12 decrease frictional surface area of deck 16. Ratchet release handle 18 doubles as a handle to manually operate deck 16 if necessary. Chain drive unit 40 has sprockets 41 and 41' which are driven by motor 43.

Figure 8:
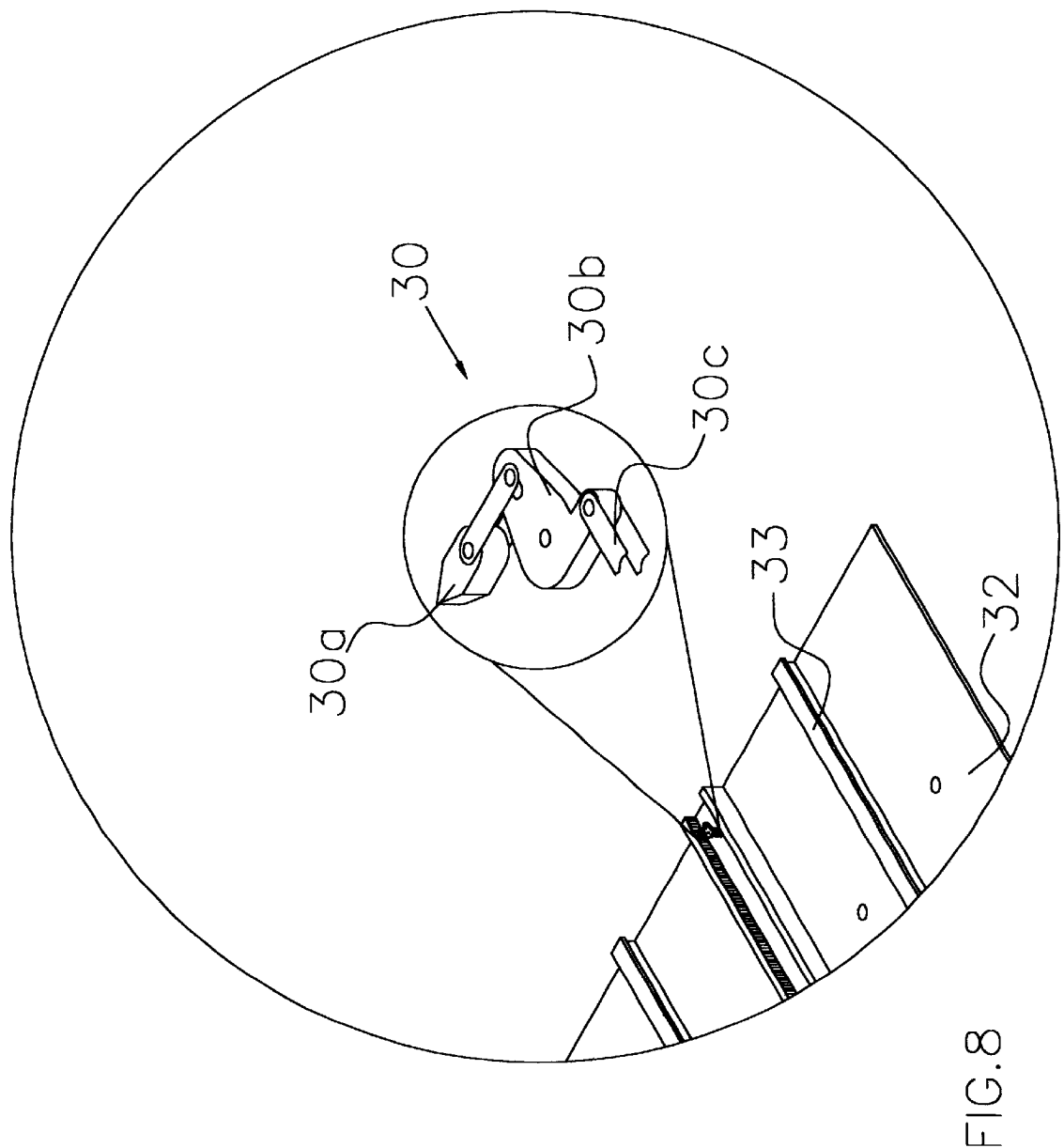
FIG. 8 is an isometric enlargement of a ratchet/pawl locking component.

In FIG. 8, ratchet unit 30 comprises control arm 30c which turns cam block 30b to disengage pawl 30a from track 34 (FIG. 7)

Figure 9:
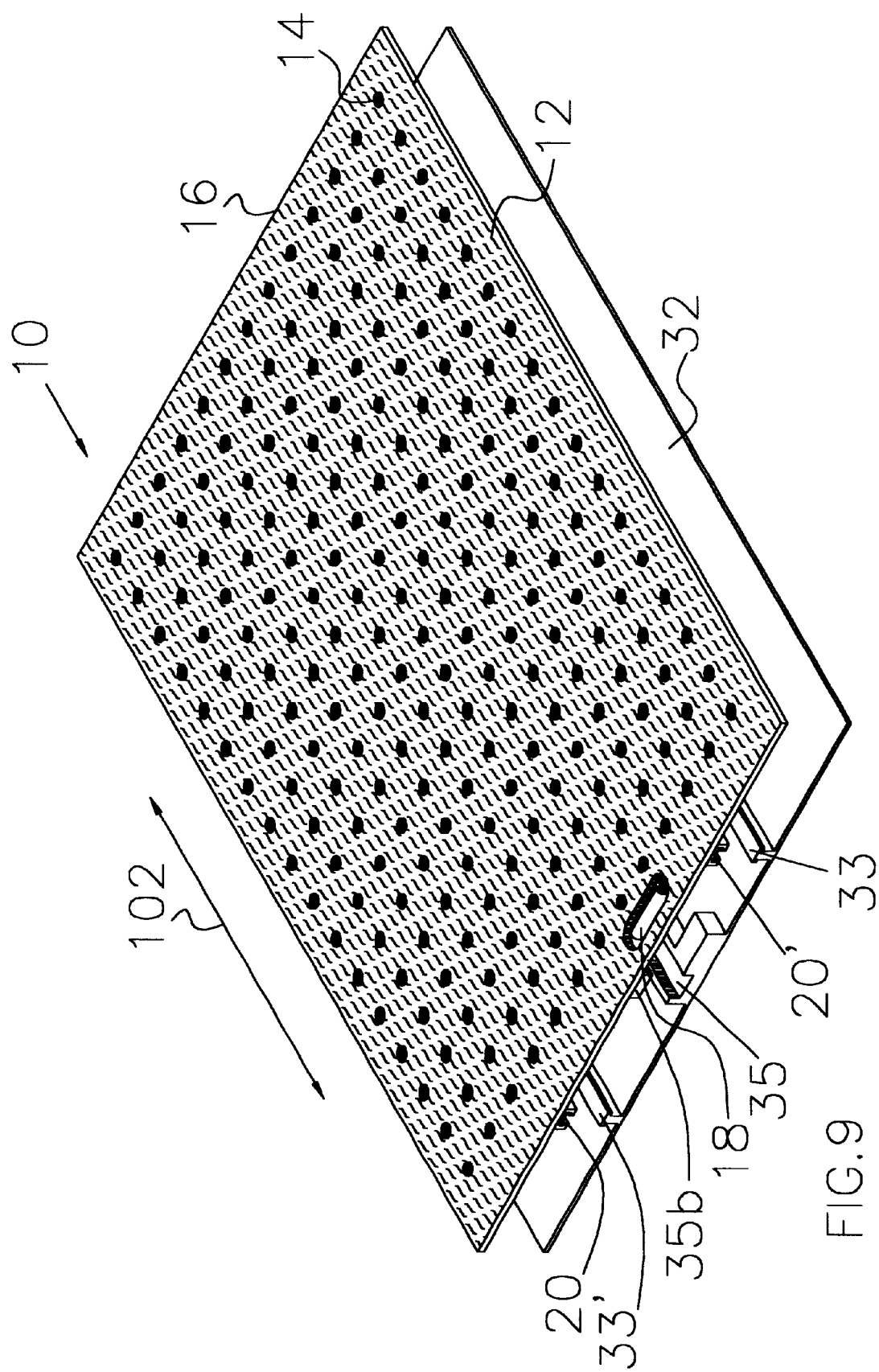
FIG. 9 is an isometric view of the invention showing the direction of deployment of the deck unit.

In FIG. 9, arrows 102 denote the directions in which deck 16 can move.

Figure 10:
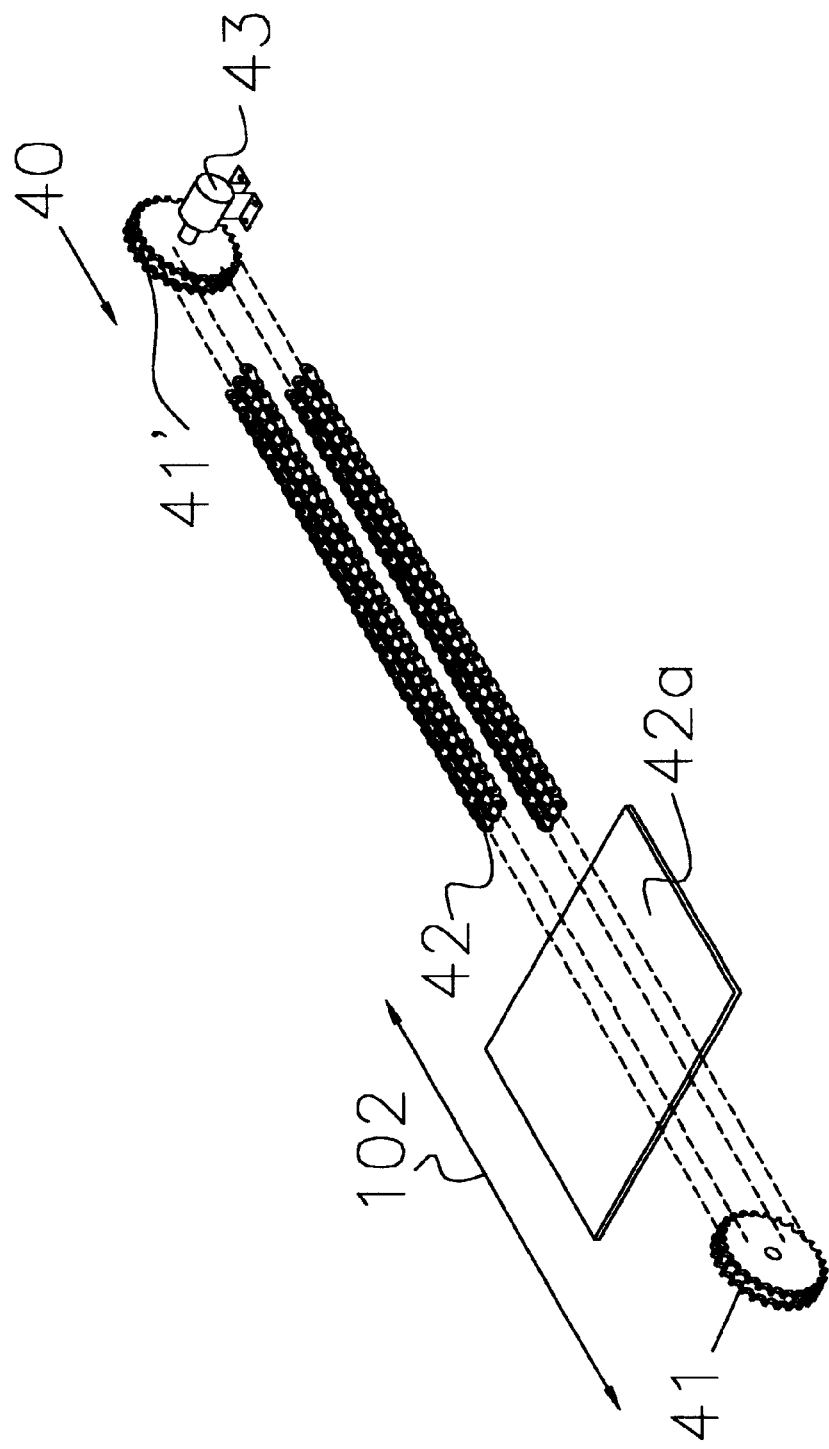
FIG. 10 is an isometric view enlargement of a chain drive unit for moving the deck unit.

In FIG. 10, attachment point 42a is moved in the direction of arrows 102 to move bed 16. Motor 43 drives cog 41', chain 42 and cog 41.

Figure 11:
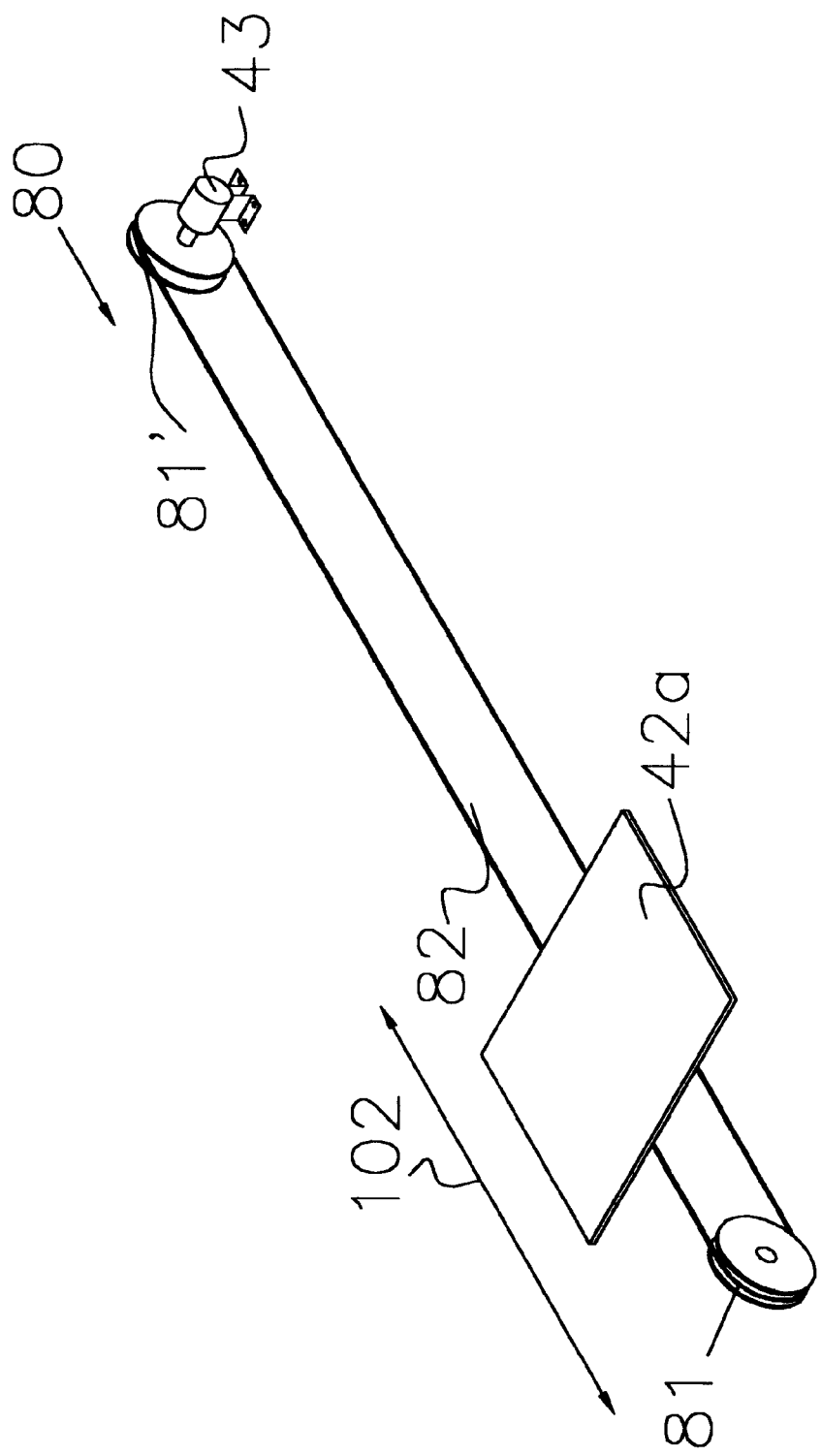
FIG. 11 is and isometric view of a cable drive unit for moving the bed.

In FIG. 11 drive unit 80 motor 43 drives pulleys 81 and 81' and cable 82 which is attached to attachment point 42a and moves in the direction of arrows 102.

Figure 12:
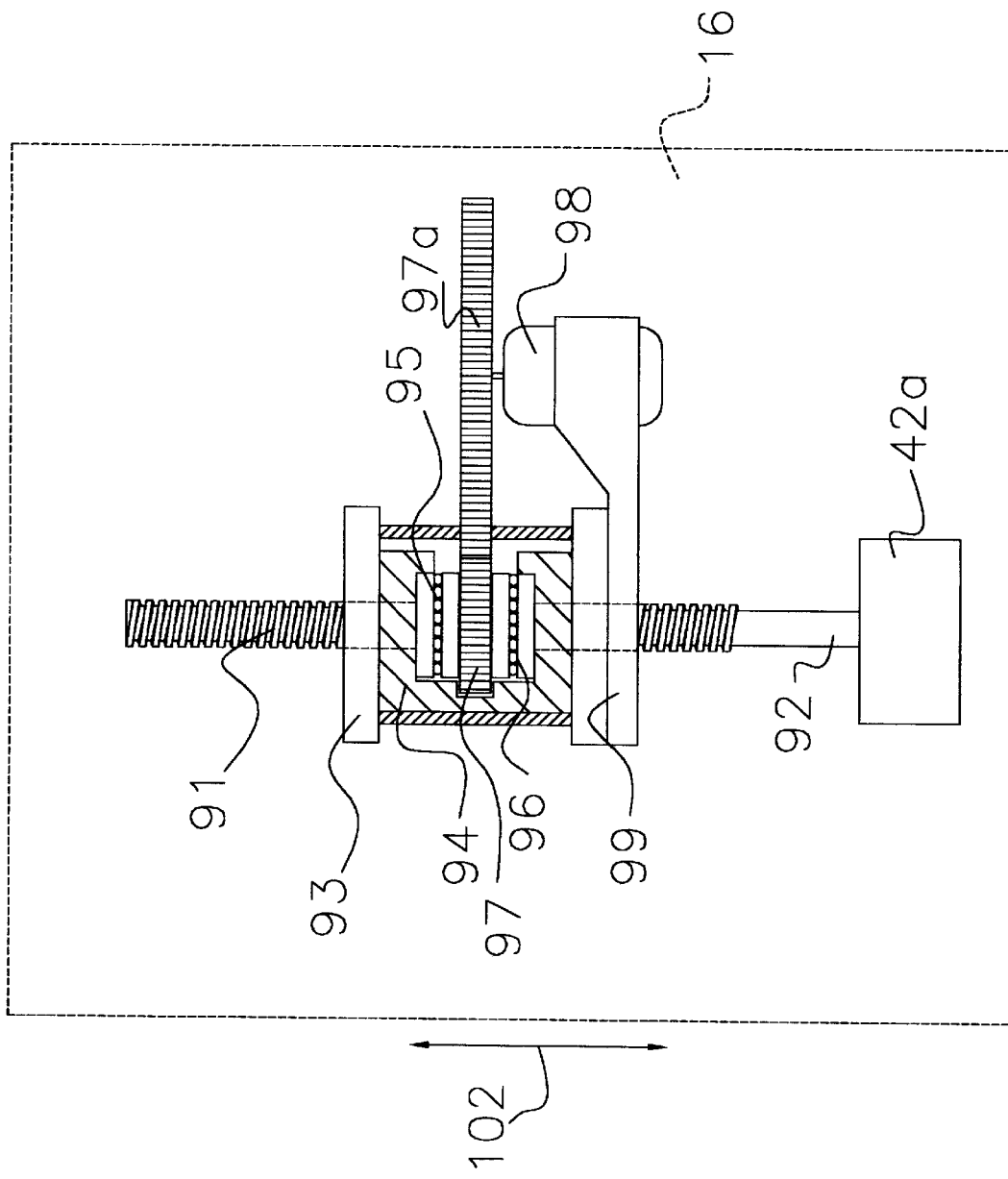
FIG. 12 is a top view (not to scale) of a worm drive unit for moving the bed.

FIG. 12 presents a worm-drive method for moving deck 16 which is fixed to attachment point 42a. As reversible motor 98 turns gears 97 and 97a, thrust bearing 95 and 96 position screw shaft 91/92 within bracket 94 in housing 93 and motor mount 99 holds motor 98 in position. Attachment point 42a is fixed to deck 16 which travels in the direction of arrows 102 in response to the linear movement of screw shaft 91/92.

CONCLUSION

It should be noted that the embodiments of the VEHICLE SLIDING FLOOR EXTENSION presented herein in detail for exemplary purposes is subject to variations in structure, design, application and methodology. Due to the fact that a variation of embodiments may be derived within the scope of the inventive concepts herein taught, and numerous modifications may be made to the exemplary embodiment herein presented in accordance with the descriptive requirements of the law, it should be understood that the details herein included in the detailed description of the present invention are to interpreted as illustrative in nature and not in a limiting sense. Thus the scope of the invention should be determined by the appended claims and their legal equivalents, rather than by the examples given.

What is claimed is:

1. An extendable vehicle cargo floor assembly comprising:

a base of semi-rigid material defining a sub-floor and having a plurality of dorsal "T" shaped male track protrusions, said base having attachment means, said attachment means having a plurality of holes and a plurality of mechanical fasteners, said holes being generally arranged to provide suitable locations for said fasteners, said base having a central rail protrusion having a "U" shaped channel formed therein, said channel having a first vertical wall and a second vertical wall, said first wall having a multiplicity of toothed indentations formed thereon, said central protrusion having a further stop protrusion, said stop protrusion being formed perpendicularly, a deck of semi-rigid material generally overlaying said base, said deck having a first upper surface and a second lower surface, said lower surface having a plurality of integrally formed female slots, said dorsal "T" shaped male protrusions being slidably engaged within said female slots, a plurality of holes formed in said first upper surface, said upper holes being generally arranged in a grid pattern, said upper surface having a textured pattern formed thereon, a central track protrusion, said central rail protrusion having a further stop protrusion, said stop protrusion being formed perpendicularly, said central track protrusion and said stop protrusion engaging respectively with said base "U" channel and said base stop protrusion, a plurality of pendulous male skid protrusions, said male skid protrusions providing support to said deck as it traverses said base, and adjustment means for moving said deck between a retracted position and an extended position.

2. An extendable vehicle cargo floor assembly of claim 1 wherein said adjustment means comprises an adjustment mechanism, said mechanism having a control means, a motor, a first chain cog and an endless loop chain, said motor being attached to said first chain cog, said chain being connected to said first cog and a second cog, an attachment means, a locking mechanism having a handle attached to a ratchet pawl, said pawl engaging and disengaging said toothed indentations to permit said deck to be incrementally positioned, said deck being finally restrained at a travel limit by the engagement of said base and said deck stop protrusion.

3. An extendable vehicle cargo floor assembly of claim 2 including a plurality of "L" shaped partitions, said partitions having an upper edge and a lower edge, said lower edges having a plurality of male pegs protruding therefrom, said upper edges having a plurality of holes formed thereupon, said holes being of subtantially equivalent diameter as said pegs, said pegs being of substantially equivalent diameter to said holes in said deck, said partitions being attachable to said deck thereby providing adjustable containment means.

4. An extendable vehicle cargo floor assembly of claim 1 wherein said adjustment means comprises a plurality of pulleys and a flexible cable connected therebetween.

5. An extendable vehicle cargo floor assembly of claim 1 wherein said adjustment means comprises a screw shaft and gear assembly.

* * * * *